(No Model.) 2 Sheets—Sheet 1.
J. TURNER.
WHEEL.
No. 512,459. Patented Jan. 9, 1894.
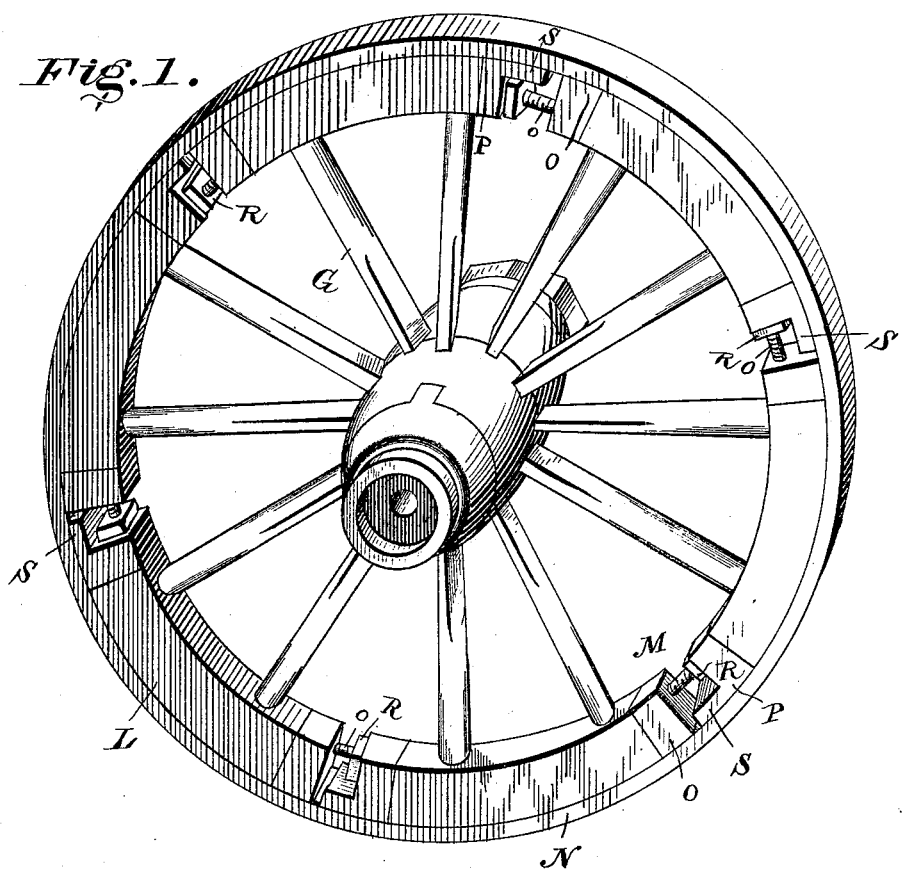
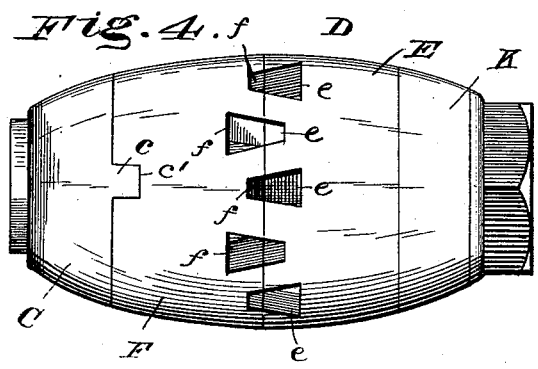
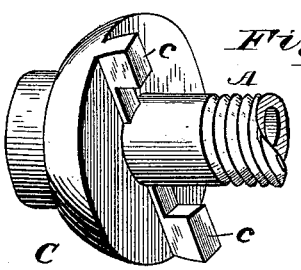
Witnesses
Inventor
Jonah Turner,
By his Attorneys,

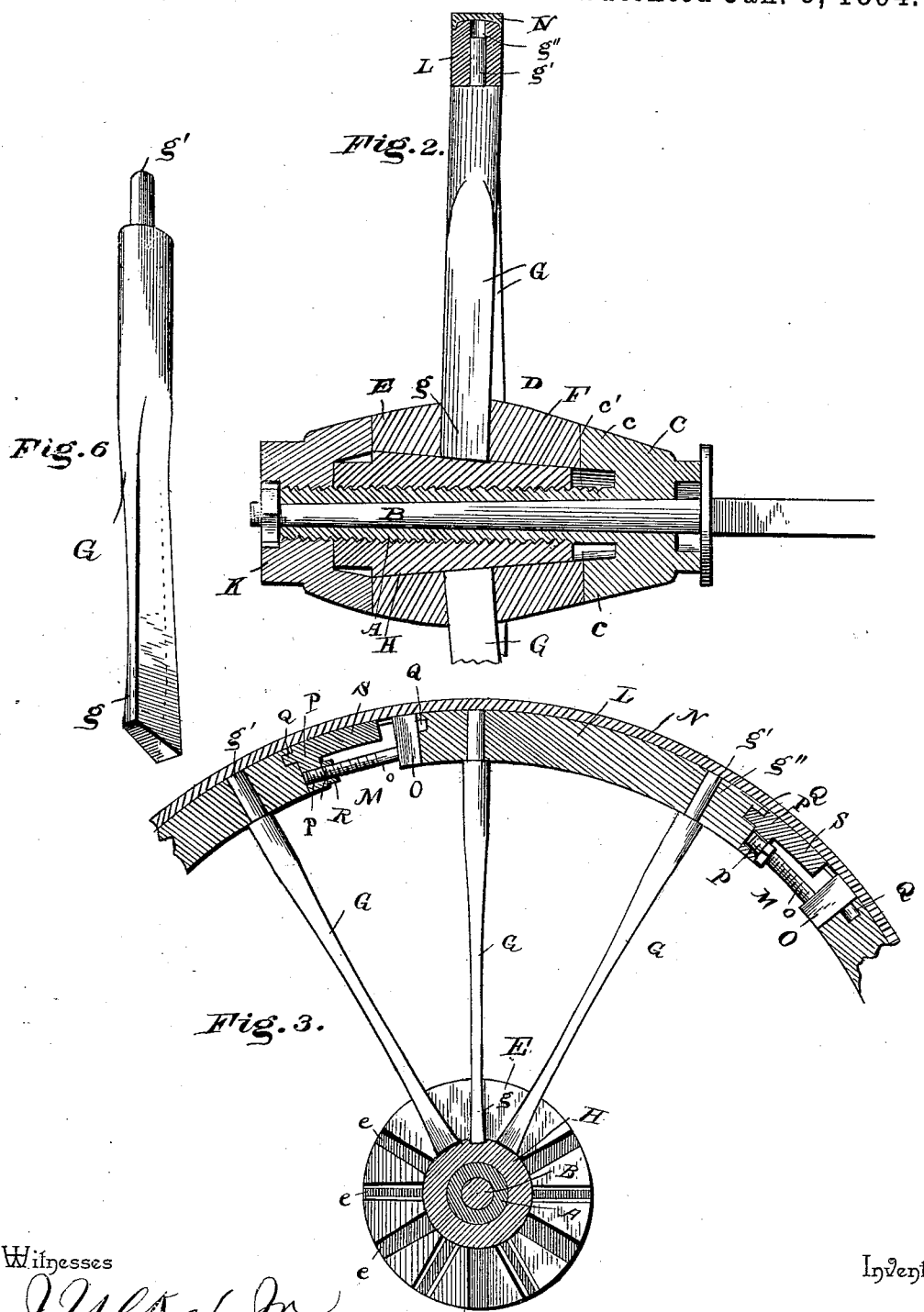

UNITED STATES PATENT OFFICE.

JONAH TURNER, OF BLENDSVILLE, MISSOURI, ASSIGNOR OF ONE-FOURTH TO DUDLEY COLCLASURE, OF SAME PLACE.

WHEEL.

SPECIFICATION forming part of Letters Patent No. 512,459, dated January 9, 1894.

Application filed January 23, 1893. Serial No. 459,461. (No model.)

*To all whom it may concern:*

Be it known that I, JONAH TURNER, a citizen of the United States, residing at Blendsville, in the county of Jasper and State of Missouri, have invented a new and useful Wheel, of which the following is a specification.

My invention relates to improvements in wheels for buggies, wagons, farm implements, &c., the objects in view being to provide means for tightening the tire which shall cause a regular extension or enlargement of the felly; furthermore, to provide improvements in means for securing the spokes in the felly and hub; and furthermore, to provide means for connecting the separable parts to the hub.

Further objects and advantages of my invention will appear in the following description, and the novel features thereof will be particularly pointed out in the appended claims.

In the drawings, Figure 1 is a perspective view of a wheel embodying my improvements. Fig. 2 is a central section of the same taken axially through the hub. Fig. 3 is a detail sectional view of a portion of the felly and tire taken longitudinally through one of the tension devices at right angles to the plane of Fig. 2. Fig. 4 is a plan view of the hub with spokes detached, to show the shape and arrangement of the spoke sockets. Fig. 5 is a detail view in perspective of the rear cap for the hub. Fig. 6 is a similar view of one of the spokes.

A designates the bearing sleeve, which is adapted to fit upon the spindle of the axle, B, said sleeve being carried by the rear cap, C, which is preferably integral therewith.

The body-portion, D, of the hub comprises the front ring or annular section, E, and the rear ring or annular section, F, said rings or sections fitting snugly together at their meeting edges. The body-portion is provided with a tapered bore, which reduces in size toward the rear end of the hub, and the rear cap, above described, is provided upon its front face with lugs, *c c*, to engage corresponding notches *c' c'*, in the adjacent rear edge of the rear section, to hold the cap and the sleeve stationary with the body portion of the hub.

The hub-sockets, or those sockets which are arranged in an annular series in the hub for the reception of the inner ends or butts of the spokes, G, are arranged at the meeting edges of the separable sections of the hub, a portion of each socket being in each section and being in the form of recesses or notches, *e e* and *f f*, respectively. The notches *e e* in the section, E, are alternately deep and shallow, as clearly shown in the drawings, Fig. 4, and the notches, *f f*, in the section, F, are alternately deep and shallow, the deep notches of section E falling opposite the shallow notches of section F, and vice versa. In this way the necessary side thrust of the spokes is accomplished. Furthermore, the sockets which are thus provided in the hub are enlarged toward the center of the hub, and the deep notches are dovetailed in cross-section.

The spokes are provided at the inner ends with wedge-shaped enlargements, *g*, which increase in thickness toward their extremities and are dovetailed in cross-section to fit in the dovetailed notches or recesses, as above described.

The spokes are fitted into the notches or recesses of the hub-sections before the latter are placed in contact, one-half of the spokes being engaged in the deep notches of each section. When the sections are placed together the registering notches unite to complete the sockets, and the enlargements of the spokes being within the hub cannot be removed without previously separating the sections. The inner ends of the spokes are beveled, as shown, to correspond with the tapered bore of the hub.

The bearing sleeve is exteriorly screw-threaded, and extends through and beyond the hub, at its outer or front end, and upon this sleeve is fitted the interiorly threaded tightening cone, H, whose outer surface engages the inner ends of the spokes, and, when screwed tightly to place, forces the inner ends thereof firmly into the tapered sockets. The threaded sleeve extends beyond the front end of the adjusting cone and is engaged by the front cap, K, which fits tightly against the front end of the outer hub-section and is flush therewith to complete the configuration of the hub. When this front cap is screwed firmly to place all of the parts of the hub are locked.

The outer ends of the spokes are provided with reduced extensions, $g'$ $g'$, which fit in felly sockets, $g''$, in the felly, L. The felly is formed in separable sections, the abutting or adjacent ends of which are connected by the tension devices, M, adapted to force said adjacent ends apart to spread the felly and tighten the tire, N, the latter being concaved upon its inner face to fit the convexed surface of the felly. The tension device consists of two relatively adjustable members, O and P, which bear respectively against the opposing ends of the sections of the felly and are provided with studs, Q Q, to engage sockets in said opposing ends. The member O is provided with a threaded pin, $o$, and the member P with an aligned opening, $p$, whereby when the members are close together, as when the wheel is constructed, the pin will extend into said opening. The pin is engaged by an adjusting nut, R, which bears against the face of the member, P, to separate the two members. The member, P, is provided with a guard, S, to fill the interval between the members and support the tire. From the above description it will be seen that to tighten the wheel which has become loose by shrinkage or otherwise it is merely necessary to tighten the tire by the adjustment of the tension device, and then tighten the cone, which bearing against the inner ends of the spokes forces them outward until their shouldered outer ends strike the inner surface of the felly, thereby making the wheel firm and rigid in all its parts.

I have found that merely the adjustment of the tire by the stretching or extension of the felly is not sufficient to make the wheel sound and firm, and therefore, in connection with the improved tension device for the felly I employ means to extend the spokes and stiffen the entire structure.

Having thus described my invention, what I claim, and desire to secure by Letters Patent, is—

1. In a wheel, the combination of a hub comprising separable rings or annular sections meeting upon the line of the inner ends of the spokes and provided at such meeting ends with registering notches or recesses which combine to form spoke-sockets dove-tailed in cross-section and enlarged toward their inner ends, means for locking said rings or sections in their operative positions, and spokes having their inner ends shaped to correspond with such sockets and fitting therein, substantially as specified.

2. In a wheel, the combination of a hub comprising separable rings or annular sections meeting upon the line of the inner ends of the spokes and provided at such meeting ends with registering notches or recesses which combine to form spoke-sockets enlarged toward their inner ends, having inwardly-divergent sides, and dove-tailed in cross-section with the reduced ends of alternate sockets arranged upon opposite sides of the meeting line of the rings or sections, spokes provided with enlarged and dove-tailed inner ends which conform to and fit in said sockets, an exteriorly-threaded bearing sleeve arranged axially in the hub, and an adjusting cone threaded upon said sleeve and provided with an exterior surface to engage the inner ends of the spokes, substantially as specified.

3. In a wheel, the combination of the hub having separable rings or annular sections the meeting edges of which are provided with registering notches or recesses which combine to form spoke-sockets, the spokes fitting at their inner ends in said sockets, the exteriorly threaded bearing sleeve carrying a rear cap to bear against the end of one of the rings or sections, an adjusting cone threaded upon said sleeve and bearing against the inner ends of the spokes, and the front cap threaded upon the front end of the sleeve and bearing against the front end of the other ring or section, substantially as specified.

4. In a wheel, the combination of the hub comprising separable annular sections provided in their meeting edges with registering notches of varying depths and dovetailed in cross section, said notches combining to form dovetailed sockets which are also enlarged inwardly, the spokes provided with wedge-shaped and dovetailed enlargements to fit in said sockets, the threaded bearing sleeve and the adjusting cone threaded upon the sleeve to engage the inner ends of the spokes, said sleeve carrying the front and rear caps to engage the outer ends of the sections of the hub, substantially as specified.

5. In a wheel, the combination with a sectional felly of the tension device having opposing members provided, respectively with studs to engage said sockets in the opposing faces of the felly sections, the threaded pin carried by one member, an adjusting nut engaging said pin and bearing against the other member, the latter carrying a guard or flange to cover or fill the interval between the members, substantially as specified.

6. In a wheel, the combination with a sectional felly having a transversely convexed outer face, and a tension device arranged between opposing faces of the sections forming the felly and having relatively adjustable members connected by a threaded pin and adjusting nut and provided with convexed outer faces flush with the outer surface of the felly, of the tire having a transversely concaved inner surface to fit the convexed surface of the felly, substantially as specified.

In testimony that I claim the foregoing as my own I have hereto affixed my signature in the presence of two witnesses.

JONAH TURNER.

Witnesses:
F. P. CLAYCOMB,
W. B. DUNIVIN.